United States Patent [19]

Weisigk et al.

[11] 4,001,516
[45] Jan. 4, 1977

[54] APPARATUS FOR FEEDING AND CONTROLLING RINGING CURRENTS IN TELECOMMUNICATION SYSTEMS

[75] Inventors: Günther Weisigk, Zurich; Karlheinz Schmäh, Adliswil; Harald Berger, Zurich, all of Switzerland

[73] Assignee: Siemens-Albis Aktiengesellschaft, Zurich, Switzerland

[22] Filed: Aug. 21, 1975

[21] Appl. No.: 606,385

[30] Foreign Application Priority Data

Sept. 24, 1974 Switzerland .................... 12916/74

[52] U.S. Cl. ............................................. 179/84 R
[51] Int. Cl.² ........................................... H04M 3/02
[58] Field of Search ......... 179/18 HB, 18 F, 18 FA, 179/84 R, 84 A, 99, 81 R

[56] References Cited

UNITED STATES PATENTS

| 3,145,266 | 8/1964 | Owen | 179/84 R |
| 3,882,282 | 5/1975 | Picandet | 179/84 R |

FOREIGN PATENTS OR APPLICATIONS

| 1,537,769 | 2/1970 | Germany | 179/84 R |

*Primary Examiner*—Thomas A. Robinson
*Attorney, Agent, or Firm*—Benoit Law Corporation

[57] ABSTRACT

Apparatus is disclosed for feeding ringing currents from a ringing current supply to line circuits, and for controlling ringing currents in such line circuits, in telephone and other telecommunication systems having an exchange equipped with a source of supply voltage and having subscriber circuits equipped with a ringing circuit capacitor. The disclosed invention comprises a combination of a junction for feeding ringing currents to line circuits, a diode connected between the feeding junction and a pole of the source of supply voltage, an electronic switching device having a control electrode and being connected between the ringing current supply and the feeding junction, and equipment connected to the control electrode of the switching device for causing the switching device to switch ringing currents on and off instantly and to discharge the ringing circuit capacitor.

35 Claims, 6 Drawing Figures

APPARATUS FOR FEEDING AND CONTROLLING RINGING CURRENTS IN TELECOMMUNICATION SYSTEMS

BACKGROUND OF THE INVENTION

1. Field of the Invention

The subject invention resides in apparatus for feeding and controlling ringing currents in line circuits of telecommunication and, in particular, telephone exchange systems. The line circuits may be of the type wherein the feeding of ringing currents to subscriber circuits is effected via an electronic device connected between the ringing current source and the line circuit feeding junction.

2. Description of the Prior Art

There are known telephone exchange systems in which the ringing of a subscriber is effected through feeding a low-frequency ringing current into the subscriber loop. The removal of the handset at the called subscriber station is sensed through detection of the changing condition in the particular subscriber loop. The ringing current may, for instance, be fed into the subscriber line in the form of a half-wave signal, and the connection of the ringing current may advantageously be effected with controlled semiconductors.

In order to keep the switching equipment as simple as possible, it is advantageous to effect a direct feeding of the ringing current into the subscriber line and to the subscriber to be called. This direct feeding technique resides in the fact that a controlled switching device is disposed between the source issuing the calling signal and the feeding junction in the line circuit.

SUMMARY OF THE INVENTION

It is an object of this invention to realize a direct ringing current feed-in of the latter type with modest means and by utilization of a semiconductor switching device.

It is a further object of this invention to assure a switching on and off of the ringing current which, in contrast to corresponding known apparatus, is undelayed. This undelayed switching on and off of the ringing current has the advantage that no detrimental alternating current can reach the microphone and the earphone after removal of the handset.

It is also an object of this invention to enable the discharge of ringing circuit capacitors over the mentioned switching element.

The subject invention realizes these objects by providing a unidirectional current conducting or rectifier element between the feeding junction and one pole of the supply voltage source at a direction of conduction determined by the polarity of the fed-in ringing current, and by providing ringing current switching means connected to a control electrode of the electronic switching element for an undelayed switching on and off of the ringing current via the electronic switching element as well as for the discharge of the ringing circuit or bell capacitor via the electronic switching element.

The subject invention resides in apparatus for feeding ringing currents from a ringing current supply to line circuits, and for controlling ringing currents in such line circuits, in telephone and other telecommunication systems having an exchange equipped with a source of supply voltage, and having subscriber circuits equipped with a ringing circuit capacitor.

The subject invention resides, more specifically, in the improvement comprising, in combination, means including a junction for feeding ringing currents to line circuits, means connected between the feeding junction and a pole of the source of supply voltage for preventing short-circuiting of ringing currents, an electronic switching device including semiconductive means for discharging the ringing circuit capacitor and semiconductive switching means having a control electrode and being connected between the ringing current supply and the feeding junction, and means connected to the control electrode of the switching device for causing the switching device to switch ringing currents on and off instantly and to discharge the ringing circuit capacitor.

From another aspect thereof, the subject invention resides in apparatus for feeding ringing currents from a ringing current supply to a line circuit, and for controlling ringing currents in the line circuit, in telephone and other telecommunication systems having means including a junction for feeding ringing currents to the line circuit, and having a subscriber circuit equipped with a ringing circuit capacitor. The invention according to this aspect resides, more specifically, in the improvement comprising, in combination, means including a thyristor having a control electrode and being connected between the ringing current supply and the feeding junction for selectively feeding ringing currents to the line circuit, means for providing a first control signal for establishing a predetermined ringing rate, means connected to the line circuit for providing a second control signal for characterizing the loop condition of the particular line circuit, means connected to the ringing current supply for providing a third control signal for determining the firing point of the thyristor, and means including logic circuit means connected to the first, second and third control signal providing means and to the control electrode for controlling the thyristor in response to the first, second and third control signals.

BRIEF DESCRIPTION OF THE DRAWINGS

The invention and its objects will become more readily apparent from the following detailed description of preferred embodiments thereof, illustrated by way of example in the accompanying drawings, in which.

Like reference numerals in the drawings designate like or functionally equivalent parts.

DESCRIPTION OF PREFERRED EMBODIMENTS

Figure 1:
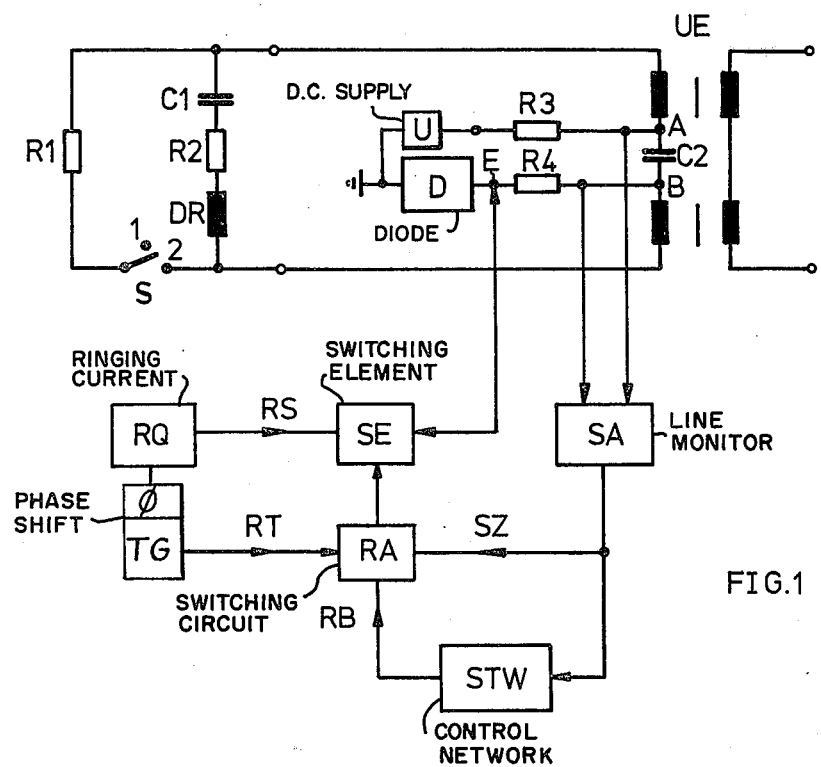
FIG. 1 is a combined block and circuit diagram of line circuitry in a telephone exchange and apparatus for feeding and controlling ringing circuits into and in the line circuitry, in accordance with a preferred embodiment of the subject invention.

In the circuitry shown in FIG. 1, the switch designated by the reference character S is the cradle switch of a subscriber station or set. If the handset is on the cradle, the line circuit extends via the choke DR and the bell illustrated by the resistor R2, as well as via the ringing circuit or bell capacitor C1. If the handset is removed from the cradle, the switch S assumes the position shown at 2 and the line circuit extends via the resistor R1 which, inter alia, includes the microphone resistance, as well as via DR, R2 and C1. Furthermore, there is situated in the line circuit a capacitor C2 which, in a manner known per se, is located between the two points, designated A and B, of the half windings of the line transformer UE.

The point A is connected on the one hand via a first supply current resistor R3 to a direct-current potential U of a supply voltage source and, on the other hand, to one input of a line monitoring circuit SA. The point B is connected to the other input of the line monitoring circuit SA and is, moreover, connected to the grounded pole of the voltage supply via a second supply current resistor R4 and a unidirectional current conducting or rectifier element D.

Between the rectifier element D and the second supply current resistor R4, there is situated the feeding junction E through which the low-frequency ringing signal or current RS proceeds from a ringing current source RQ via an electronic switching element or device SE into the line circuit.

By way of example, the ringing signal RS may be a positive or negative half-wave signal, an alternating current signal superimposed on positive or negative direct current, or another signal displaying a periodic course. Only positive or negative half-wave ringing signals are treated in the description of the illustrated examples.

The direction of conduction of the rectifier element D between ground and the feeding junction E in the preferred embodiments of the invention depends on the polarity of the fed-in half-wave ringing current. If a positive half-wave ringing current is fed into the line circuit, then the element D is inserted with the anode connected to ground. For a negative half-wave ringing current, the rectifier element D is inserted at a reverse direction. Correspondingly, the direct-current potential U is selected as negative or positive, typically at minus 48 and plus 48 volt, respectively, or at any other voltage used in the particular telephone or telecommunication system.

The rectifier element D has the following functions: It prevents that the ringing current source RQ in the illustrated circuitry is short-circuited in the calling phase via the conducting switching element SE. Only in this manner is the charging of the ringing circuit capacitor C1 enabled. At the same time, the rectifier element D establishes a direct connection between the direct-current potential U and ground.

The line monitoring circuit SA detects the prevailing loop condition in the line circuit which, in a well-known manner, depends on the position of the cradle switch S in the subscriber station or set. Monitoring circuits of this type are well known and, being for example arranged in the form of a high-ohmic bridge circuit, indicate the conditions, "open loop" or "closed loop", depending on whether the subscriber has placed the handset on the cradle or has removed the handset or is engaged in a dialing operation.

The electronic switching element SE, which in its closed condition forms the connection between the output of the ringing current source RQ and the feeding junction E in the line circuit, is controlled by a ringing current switching circuit RA. This ringing current switching circuit RA, in turn, is influenced or controlled by a signal SZ issued by the loop monitoring circuit SA and characterizing the condition of the loop and by a ringing command signal RB provided by a control network STW and determining the ringing rate or rhythm. Depending on the nature of the selected electronic switching element SE, a ringing release signal RT may be fed to the ringing switching circuit RA, as will be described more particularly in connection with FIG. 2.

By virtue of the direct connection between the loop monitoring circuit SA and the ringing current switching circuit RA, a rapid disconnection of the ringing current is achieved when the condition "loop closed" is sensed; that is, the disconnection is effected free of delay, since it is independent of the delay resulting from the detection of the loop condition by the control network STW.

This guarantees that no detrimental alternating currents can reach the microphone and the ear phone after a removal of the handset in the called subscriber set.

Further particulars of the equipment according to the invention are apparent from the descriptions of the following preferred embodiments with the aid of FIGS. 2 to 6. In these preferred embodiments, a diode D1 is used as rectifier element D.

To avoid repetition, the line circuitry described above is not shown in FIG. 2. Only the diode D1 is illustrated between ground and the feeding junction E; namely in a direction of conduction necessitated by the supply of a positive half-wave ringing current.

Figure 2:
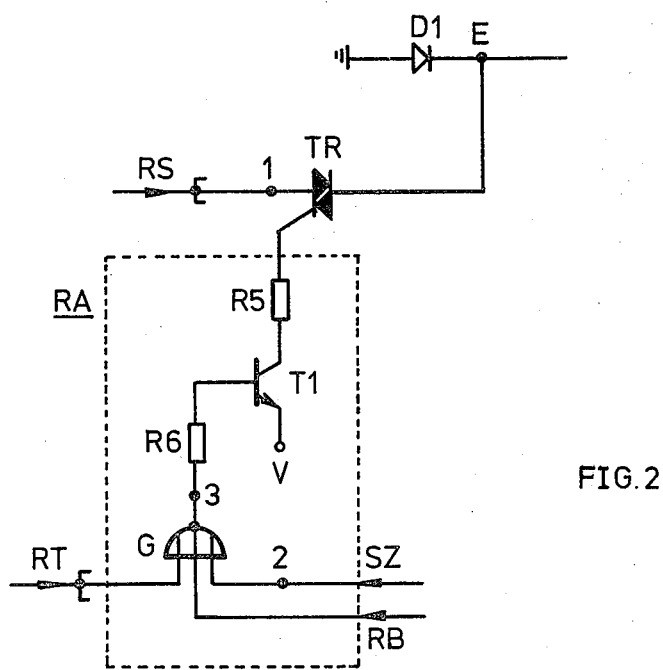
FIG. 2 is a circuit diagram of a more specific preferred embodiment of the subject invention.

FIG. 2 shows a preferred embodiment with a two-way thyristor (TRIAC) or two-way silicon controlled rectifier TR as switching element. The thyristor TR is connected between the output of the ringing current source RQ and the feeding junction E. The control electrode of the two-way thyristor TR is connected via a resistor R5 to the collector of a transistor T1. The base of the transistor T1 is connected via a resistor R6 to the output of a NOR gate G which has three inputs. The emitter of the transistor T1 is biased by a voltage V which is negative relative to ground. In general, this voltage V is selected in consideration of the voltage level relationships applying at the output of the NOR gate G.

The resistors R5 and R6 serve to limit of the collector current and base current, respectively, of the transistor T1.

A first input of the NOR gate G is connected to the output of the loop monitoring circuit SA, a second input is connected to the output of the mentioned control network STW which issues the ringing command signal RB, and a third input is connected to the output of an apparatus which generates the ringing release signal RT. The latter apparatus comprises essentially a phase shifting network $\phi$ and a Schmitt trigger TG which converts a sine wave signal, derived from the ringing signal RS and shifted in phase by the phase shifting network $\phi$, to a square wave signal. The symbol in FIG. 2 between the arrow at the reference RS and the point 1 indicates that the ringing current source RQ may feed the ringing signal to several line circuits via multiple lines. The same applies analogously to the ringing release signal RT.

The operation of the switching apparatus according to FIG. 2 is as follows:

The ringing signal RS from the ringing current source RQ is constantly applied to the two-way thyristor TR. During the ringing cycle, the subscriber loop is open;

that is, no direct current flows in the loop and the loop monitoring circuit SA applies to the associated input of the NOR gate G a potential which corresponds to a logic 0. Also, a ringing command signal RB which comprises a potential alternating from logic 0 to logic 1 in the rhythm of the ringing rate, is applied by the control network STW to an associated input of the NOR gate G. In the calling cycle, this potential corresponds to a logic 0.

The square wave ringing release signal RT is continuously applied to the third input of the NOR gate G. This square wave signal is phase shifted by a necessary amount 100 which secures the correct firing of the two-way thyristor TR; that is, the square wave signal effects after the firing of the two-way thyristor TR a change in the state of output of the NOR gate G from 1 to 0. Accordingly, the transistor T1 switches from the conducting to the non-conducting state. The two-way thyristor TR switches itself off automatically in the course of the declining positive half wave of the ringing signal.

In order to enable a discharge of the ringing circuit capacitor C1 via the two-way thyristor TR, the phase-shifted ringing release signal RT causes the output of the NOR gate G in the intervals between the ringing half waves to return to the condition 1, which places the transistor T1 in its conducting condition. In this manner, a current which is limited by the resistor R5 flows through the collector-emitter path of the transistor T1 and re-fires the two-way thyristor TR so that the discharge of the ringing circuit capacitor C1 is made possible.

If now the handset is removed at the subscriber station in the calling cycle, then a direct current flows in the subscriber loop and is detected by the loop monitoring circuit SA at the latest during the first interval between two ringing half waves.

This change in the loop condition has the consequence that at the associated input of the NOR gate G an immediate change of the condition from logic 0 to 1 takes place.

This change, in turn, switches the output of the NOR gate G to the logic condition 0 which is tantamount to a blocking of the transistor T1. The two-way thyristor TR therefore receives no firing current and thus remains blocked, whereby the ringing signal RS is disconnected without delay.

Figure 3:
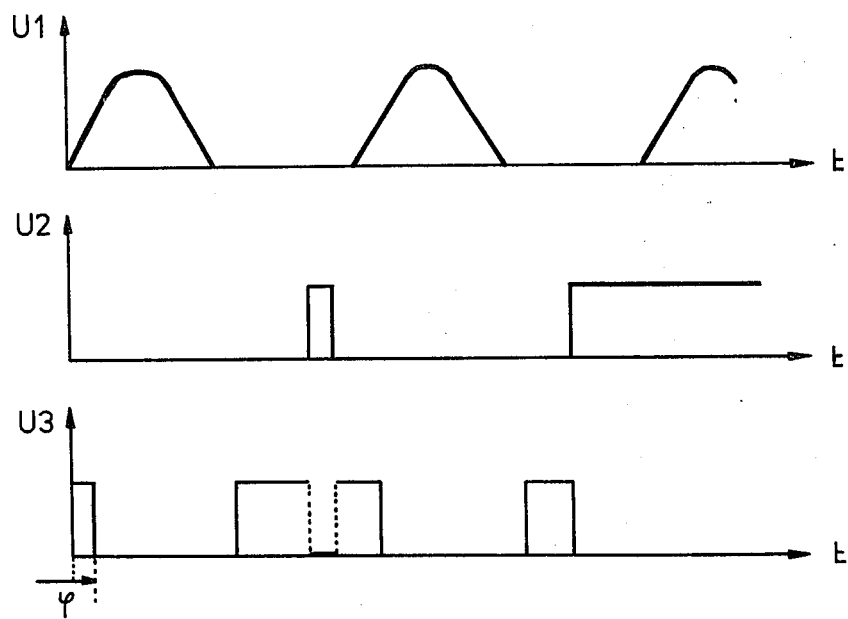
FIG. 3 illustrates waveforms occurring in the preferred embodiment of FIG. 2.

The voltage variations U1, U2 and U3 at the points 1, 2 and 3 of the circuitry of FIG. 2 are apparent from FIG. 3. In addition, there is shown by dotted lines in the waveform U3 and by a corresponding pulse in the waveform U2, a case wherein the loop monitoring circuit SA determines between two ringing signal half waves the condition "loop closed" because of a spurious pulse. This effects a brief disconnection of the current which controls the two-way thyristor TR and an automatic switching on of that current. Such a disturbance during a ringing half wave has, however, no influence on the operation of the equipment.

Figure 4:
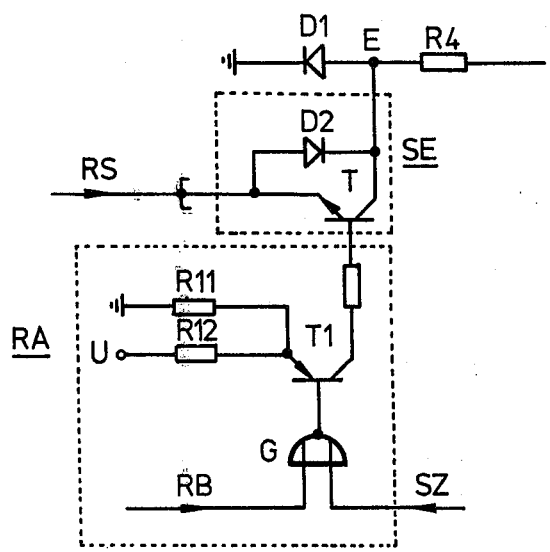
FIGS. 4 to 6 are circuit diagrams of ringing current feeding and control equipment in accordance with further preferred embodiments of the subject invention.

FIG. 4 shows a preferred embodiment of the subject invention for the feeding of a negative half-wave ringing current via a transistor T as switching element SE. The control of this transistor T is effected by a NOR gate G through a further transistor T1. The NOR gate G is controlled or influenced by the ringing command signal RB and the signal SZ which characterizes the loop condition.

The ringing signal RS is applied via the transistor T and the diode D1. A diode D2 connected between the emitter and collector of the transistor T serves as overvoltage protection as well as the discharge of the ringing circuit capacitor C1. The emitter potential at the transistor T1 is determined by the resistors R11 and R12 so that this transistor is switchable by the NOR gate G into the conductive or non-conductive condition. The direct current U in the present embodiment is positive.

In the ringing phase, the output of the NOR gate G assumes a logic potential of 0, which is smaller than the emitter bias of the transistor T1, whereby the transistor T1 becomes conducting. As soon as the transistor T1 has become conducting, the transistor T receives a base current and becomes also conducting. The transistor T1 is thereupon blocked at the change of the output of the NOR gate G from logic 0 to logic 1. It is obvious that the principle of this arrangement may also be applied to a feed-in of a positive half-wave ringing current.

Figure 5:
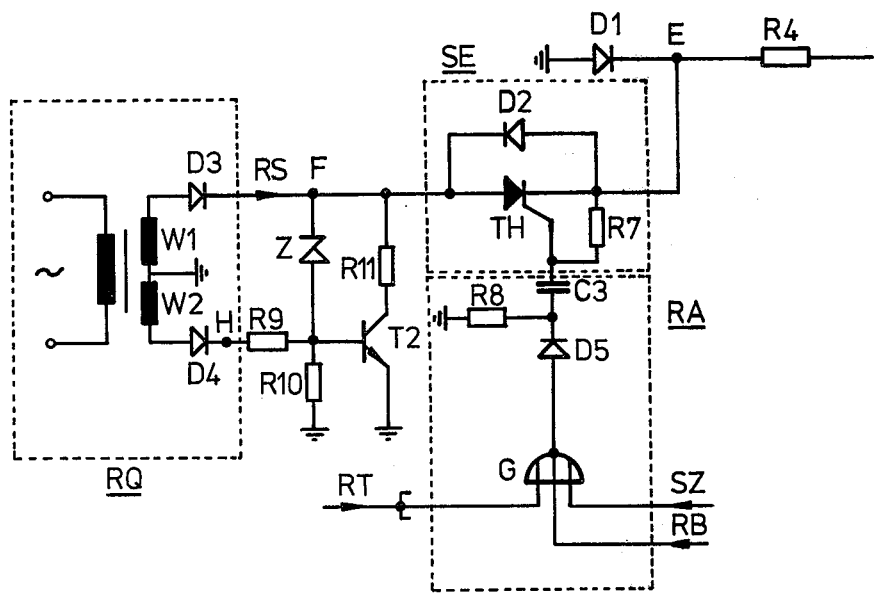

FIG. 5 shows further preferred embodiment of the subject invention having a thyristor TH as switching device SE and being arranged for the feed-in of a positive half-wave ringing current. Of the line circuit described with reference to FIG. 1, only the diode D1, the second supply current resistor R4 and the feeding junction E located therebetween are shown in FIG. 5.

Particulars of a simple ringing current supply RQ for generating a positive half-wave ringing signal are also apparent from FIG. 5. This simple ringing current source RQ consists essentially of a transformer, the primary winding of which is energized by an alternating current and the secondary winding of which consists of two half or partial windings W1 and W2. The common point of, or junction between, these two partial windings W1, W2 is connected to ground via a tap. The sense of winding of the two partial windings W1 and W2 is chosen so that phase opposite alternating currents occur across the two partial windings W1, W2.

As further seen in FIG. 5, the first partial winding W1 is connected via a diode D3 to the anode of the thyristor TH, the cathode of which is connected to the feeding junction E. The thyristor TH is bridged in its backward or reverse direction by a diode D2. The control electrode of the thyristor TH is connected via a coupling capacitor C3 and a diode D5 to the output of a NOR gate G, with the anode of the diode D5 being connected to the output of the NOR gate G. A resistor A connects the junction point between the coupling capacitor C3 and the diode D5 to ground. A resistor R7 connects the control electrode of the thyristor TH to the cathode of this thyristor TH.

The three inputs of the NOR gate G are wired up analogously to the described embodiment according to FIG. 2. The second partial winding W2 of the transformer in the ringing current supply RQ leads via a diode D4 and a resistor R9 to the base of a transistor T2, the collector of which is connected to the cathode of the diode D3 by a resistor R11, and the emitter of which is grounded.

The base of the transistor T2 is grounded via a resistor R10. Furthermore, a Zener diode Z is connected between the base of the transistor T2 and the cathode of the diode D3, with the anode of the Zener anode Z being connected to the base of the transistor T2.

This embodiment takes into consideration the possibility of high external voltages in the subscriber lines.

Such positive or negative peak voltages could endanger the diode D1, the switching device SE (thyristor TH and diode D2), the ringing current source RQ with transistor T2 and the NOR gate G, and may even lead to their destruction. In the preferred embodiment according to FIG. 5, occurring negative external voltages are discharged to ground through the diode D1 and are thus not able to affect other parts of the circuitry. The neutralization of overvoltages is thus a further important function of the diode D1.

In the case of positive externally imposed voltages, a voltage division is achieved at point F with the aid of the second supply current resistor R4 and the Zener diode Z in conjunction with the transistor T2, with the resistor R4 limiting moreover the possible current. The Zener diode Z becomes conductive and controls the transistor T2 into non-conduction as soon as a high externally imposed voltage reaches the cathode of the Zener diode Z via the diode D2.

The voltage at the point F is limited to a value composed of the Zener voltage of the Zener diode Z and the base-emitter voltage of the transistor T2. The voltage limit is thus essentially determined by the selection of the Zener voltage. The combination of the Zener diode Z with the transistor T2 results in a very low-ohmic Zener diode for high voltages.

The diode D5 protects the output of the NOR gate G. The relationship or ratio of the resistor R7 to the resistor R8 and the capacitive reactance or capacitance of the capacitor C3 are selected so that the gate-cathode path of the thyristor TH is protected in reverse direction against overvoltages.

The diode D2 together with the collector-emitter path of the transistor T2 form a discharge path for the capacitors C1 and C2 shown in FIG. 1. Of these capacitors, C1 is the ringing circuit or bell capacitor in the subscriber station, and C2 is the capacitor between partial windings of the transformer in the line circuit of the exchange. The resistor R11 functions as current limiter. The diode D4 and the resistor R10 protect the base-emitter path of the transistor T2. The resistor R9 is selected so that the transistor T2 can be controlled into saturation. The resistor R8 enables the recharging of the capacitor C3.

The function of the apparatus shown in FIG. 5. is as follows:

Pursuant to the description according to FIG. 2, the NOR gate G assumes at its output a logic state on the basis of the information or signals applied to its inputs. In other words, a logic 1 occurs at the output of the NOR gate G when a ringing command signal RB from the control network STW, a loop condition indication of "open" and a ringing release signal RT are applied simultaneoulsy to the respective inputs of the NOR gate G. The jump from logic 0 to logic 1 at the output of the NOR gate G is tantamount to a pulse edge capable of firing the thyristor TH.

The positive half waves generated with the aid of the half-wave rectification by the diode D3 reach the subscriber line as a ringing signal RS via the fired thyristor TH. The discharge of the bell or ringing circuit capacitor C1 in the subscriber station is effected via the diode D2 and the transistor T2 to ground. The transistor T2 is rendered conductive during each negative half wave at the winding W1 and nearly forms a short circuit between the anode of the thyristor TH and ground. If the handset in the subscriber station is removed from the cradle during the calling phase, the line monitoring circuit SA recognizes immediately the condition "open loop ". This effects an immediate change of the state at the output of the NOR gate G from logic 1 to 0 and prevents a further firing of the thyristor TH.

It is possible that the ringing circuit capacitor C1 with capacitor C2 cannot completely be discharged if the available time for the discharge is smaller than the time constant which is essentially determined by the ringing circuit capacitor C1, the resistances of R2, R3, R4 and the line resistance or reactance. This raises the danger that the thyristor TH cannot be fired at every desired point of time and thus during each ringing half wave. This occurs if the cathode of the thyristor TH at the firing time point is more positive than its control electrode.

This danger is counteracted in the present preferred embodiment on the one hand with the ringing release signal RT and on the other hand with the alternating-current type coupling between the output of the NOR gate G and the control electrode of the thyristor TH. The ringing release signal RT is shifted in its phase relative to the ringing signal RS by such an amount that the firing pulse for the transistor TH occurs at the output of the NOR gate G only when the amplitude of the ringing signal RS has reached a predetermined value. This amplitude value is chosen so that the anode of the thyristor TH is more positive than its cathode for each case; that is, for any discharge condition of the capacitors C1 and C2. Moreover, the resistor R7 clamps the potential of the control electrode of the thyristor TH to the value of the cathode potential so that the jump or edge from logic 0 to logic 1 of the output of the NOR gate G is superimposed on the potential at the control electrode and the thyristor TH may be fired independently of the potential at its cathode.

Figure 6:
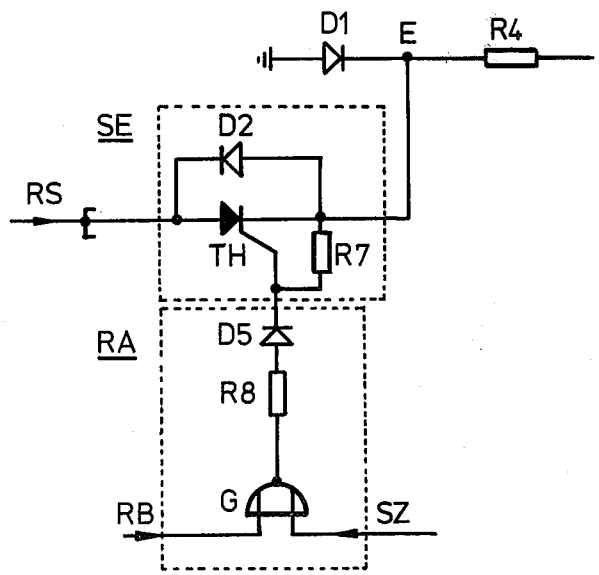

In a circuit arrangement with ringing current feeding via a thyristor, in which the discharge time of the two capacitors C1 and C2 in the subscriber line is smaller than the available time or prevailing time constant, the required components may be reduced to those shown with the aid of FIG. 6.

In particular, the ringing release signal RT and the equipment necessary for its generation may be omitted. Moreover, the output of the NOR gate G is connected through a direct-current path via a resistor R8 and a diode D5 to the control electrode of the thyristor TH. Apart from these differences, the circuits shown in FIG. 6 are essentially identical to those described above with respect to FIG. 5, and the principle of operation is identical.

The external or overvoltage protective components and circuits contained in the apparatus of FIG. 5 may self-evidently also be employed in the apparatus of FIG. 6.

The embodiments according to FIGS. 5 and 6 have the further advantage that a CMOS technique may be employed with respect to a direct control of the switching elements which feed-in the ringing signal RS with the aid of, for example, the NOR gate G. The logic function provided by the NOR gate G may self-evidently be realized with other logic elements.

All of the preferred embodiments described above are designed to enable an undelayed connection and disconnection of the half-wave ringing signal at small requirements of space and circuit components. However, the principle of the invention is also applicable to the feeding and control of ringing currents of the initially mentioned type; that is, for ringing currents other than half-wave ringing signals.

The subject extensive disclosure will suggest or render apparent various modifications and variations within the spirit and scope of the invention to those skilled in the art.

We claim:

1. In apparatus for feeding ringing currents from a ringing current supply (RQ) to line circuits, and for controlling ringing currents in said line circuits, in telephone and other telecommunication systems having an exchange equipped with a source of supply voltage (U), and having subscriber circuits equipped with a ringing circuit capacitor (C1), the improvement comprising in combination:

means including a junction (E) for feeding ringing currents to line circuits;

means connected between said feeding function (E) and a pole of the source of supply voltage (U) for preventing short-circuiting of ringing currents;

an electronic switching device (SE) including semiconductive means for discharging said ringing circuit capacitor (C1) and semiconductive switching means having a control electrode and being connected between the ringing current supply (RQ) and the feeding junction (E); and means (RA) connected to the control electrode of the switching device (SE) for causing the switching device (SE) to switch ringing currents on the off instantly and to discharge said ringing circuit capacitor (C1).

2. Apparatus as claim in claim 1, wherein:
said short-circuiting preventing means include a unidirectional current conducting device (D).

3. Apparatus as claimed in claim 2, wherein:
said ringing current supply (RQ) includes means for providing a positive ringing current; and
said undirectional current conducting device (D1) is connected with its direction of conduction toward the feeding junction (E).

4. Apparatus as claimed in claim 2, wherein:
said ringing current supply (RQ) includes means for providing a negative ringing current; and
said unidirectional current conducting device (D1) is connected with its direction of conduction away from the feeding junction (E).

5. Apparatus as claimed in claim 1, wherein:
said means (RA) for causing the switching device to switch ringing currents and to discharge the ringing capacitor include a NOR gate (G) for controlling the electronic switching device (SE); and
said apparatus includes means (STW) for providing a first control signal (RB) for establishing a predetermined ringing rate, means (SA) for providing a second control signal (SZ) for characterizing the loop condition of a particular line circuit, and means for applying said first and second control signals to inputs of said NOR gate (G).

6. Apparatus as claimed in claim 5, including:
means ($\phi$, TG) for providing a third control signal (RT) for determining the firing point of said electronic switching device (SE), and means for applying said third control signal to a further input of said NOR gate (G).

7. Apparatus as claimed in claim 6, wherein:
said means for providing said third control signal (RT) includes means ($\phi$) for shifting the phase of the third control signal (RT) relative to the phase of the ringing current (RS).

8. Apparatus as claimed in claim 6, wherein:
said electronic switching device (SE) includes a two-way thyristor (TR) having a control electrode and being connected between the output of the ringing current supply (RQ) and said feeding junction (E); and
said means (RA) for causing the switching device (SE) to switch ringing currents and to discharge the ringing circuit capacitor (C1) include a transistor (T1) having a negatively biased emitter, a base connected to the output of said NOR gate (G), and a collector conected to the control electrode of said two-way thyristor (TR).

9. Apparatus as claimed in claim 8, including:
a first resistor (R5) for connecting the collector of said transistor (T1) to the control electrode of said two-way thyristor (TR); and
a second resistor (R6) for connecting the output of said NOR gate (G) to the base of said transistor (T1).

10. Apparatus as claimed in claim 8, wherein:
said means for providing said third control signal (RT) include means ($\phi$) for shifting the phase of the third control signal (RT) relative to the phase of the ringing current (RS) by an amount securing the correct firing of said two-way thyristor (TR).

11. Apparatus as claimed in claim 5, wherein:
said electronic switching device (SE) includes a transistor (T) having an emitter connected to the output of the ringing current supply (RQ), a collector connected to said feeding junction (E), and a base, and a diode (D2) having its anode connected to the emitter of the transistor (T) and bridging the emitter-collector path of the transistor (T); and
said means (RA) for causing the switching device (SE) to switch ringing current and to discharge the ringing circuit capacitor (C1) include a further transistor (T1) having a collector connected to the base of said transistor (T) of the switching element (SE), a base connected to the output of said NOR gate (G), and an emitter, and means for biasing said emitter.

12. Apparatus as claimed in claim 11, wherein:
said ringing current supply (RQ) includes means for providing a negative ringing current; and
said diode (D1) is connected with its direction of conduction away from the feeding junction (E).

13. Apparatus as claimed in claim 5, wherein:
said electronic switching device (SE) includes a thyristor (TH) having a control electrode and being connected between the output of the ringing current supply (RQ) and said feeding junction (E), a first diode (D2) connected across said thyristor (TH) in a backward direction relative thereto, and a first resistor (R7) connected between the cathode and control electrode of said thyristor (TH); and
said means (RA) for causing the switching device (SE) to switch ringing currents and to discharge the ringing circuit capacitor (D1) include a series-connected second resistor (R8) and second diode (D5) connected between the output of the NOR gate (G) and said control electrode of the thyristor (GH).

14. Apparatus as claimed in claim 6, wherein:

said ringing current supply (RQ) includes means for providing a half-wave ringing current;

said electronic switching device (SE) includes a thyristor (TH) having a control electrode and being connected between the output of the ringing current supply (RQ) and said feeding junction (E), a first diode (D2) connected across said thyristor (TH) in a backward direction relative thereto, and a first resistor (R7) connected between the cathode and control electrode of said thyristor (TH);

said means (RA) for causing the switching device (SE) to switch ringing currents and to discharge the ringing circuit capacitor (C1) include a series-connected second diode (D5) connected to the output of said NOR gate (G) and coupling capacitor (C3) connected to the control electrode of said thyristor (TH), and a second resistor (R8) for connecting the cathode of said second diode (D5) to said pole of the source of supply voltage; and said apparatus includes a transistor (T2) having a collector connected via a resistor (R11) to the output of said ringing current supply (RQ), an emitter connected to said pole of the source of supply voltage, and a base, and means connected to said base for rendering said transistor (T2) conductive during intervals between half waves of said ringing current.

15. Apparatus as claimed in claim 14, wherein:
said ringing current supply (RQ) includes means for providing said half-wave ringing current at a positive polarity; and
said short-circuiting preventing means include a unidirectional current conducting device (D1) connected with its direction of conduction toward the feeding junction (E).

16. Apparatus as claimed in claim 14, wherein:
said means for providing said third control signal (RT) include means ($\phi$) for shifting the phase of said third control signal (RT) relative to the phase of the ringing current (RS) to render the firing of the thyristor (TH) independent of the state of discharge of said ringing circuit capacitor (C1).

17. Apparatus as claimed in claim 14, wherein:
said ringing current supply (RQ) includes means for providing at an auxiliary output (H) a signal being opposite in phase to the ringing current (RS) provided by the ringing current supply (RQ); and
said means for rendering said transistor (T2) conductive during said intervals include a resistor (R9) connecting the base of said transistor (T2) to said auxiliary output (H), a Zener diode (Z) connected between the ringing current output (F) of the ringing current supply (RQ) and the base of said transistor (T2), and a resistor (R10) connecting the base of said transistor (T2) to said pole of the source of supply voltage.

18. Apparatus as claimed in claim 13, wherein:
said ringing current supply (RQ) includes means for providing at an auxiliary output (H) a signal being opposite in phase to the ringing current (RS) provided by the ringing current supply (RQ); and
said apparatus includes a transistor (T2) having an emitter connected to said pole of the source of supply voltage, a collector and a base, a resistor (R9) connected between the base of said transistor (T2) and said auxiliary output (H), a resistor (R10) connected between said base of the transistor (T2) and said pole of the source of supply voltage, a resistor (R11) connected between the collector of said transistor (T2) and the ringing current output (F) of said ringing current supply (RQ), and a Zener diode (Z) connected between the base of said transistor (T2) and the ringing current output (F) of said ringing current supply (RQ).

19. Apparatus as claimed in claim 1, wherein:
said electronic switching device (SE) includes a two-way thyristor (TR) having said control electrode and constituting said semiconductive discharging means and said semiconductive switching means.

20. Apparatus as claimed in claim 1, wherein:
said semiconductive switching means include a thyristor (TH) said control electrode; and
said semiconductive discharging means include a diode (D2) connected across said thyristor.

21. Apparatus as claimed in claim 1, wherein:
said semiconductive switching means include a transistor (T) having said control electrode; and
said semiconductor discharging means include a diode (D2) connected across said transistor.

22. In apparatus for feeding ringing currents from a ringing current supply (RQ) to a line circuit, and for controlling ringing currents in said line circuit, in telephone and other telecommunication systems having means including a junction (E) for feeding ringing currents to said line circuit, and having a subscriber circuit equipped with a ringing circuit capacitor (C1), the improvement comprising in combination:

means including a thyristor (TH, TR) having a control electrode and being connected between the ringing current supply (RQ) and the feeding junction (E) for selectively feeding ringing currents to said line circuit;

means (STW) for providing a first control signal (RB) for establishing a predetermined ringing rate;

means (SA) connected to said line circuit for providing a second control signal (SZ) for characterizing the loop condition of the particular line circuit;

means ($\phi$, TG) connected to said ringing current supply (RQ) for providing a third control signal (RT) for determining the firing point of said thyristor (TH, TR); and means (RA) including logic circuit means (G) connected to said first, second and third control signal providing means (STW, SA, $\phi$, TG) and to said control electrode for controlling said thyristor (TH, TR) in response to said first, second and third control signals.

23. Apparatus as claimed in claim 22, wherein:
said means (RA) for controlling said thyristor (TH, TR) include means for shifting the firing of said thyristor relative to said ringing currents (RS).

24. Apparatus as claimed in claim 22, wherein:
said means (TG) for providing said third control signal (RT) include means for shifting the phase ($\phi$) of the third control signal (RT) relative to the phase of the ringing current (RS).

25. Apparatus as claimed in claim 22, wherein:
said thyristor is a two-way thyristor (TR).

26. Apparatus as claimed in claim 25, wherein:
said third signal providing means ($\phi$, TG) and said means (RA) for controlling said thyristor (TR) include means for selectively discharging said ringing circuit capacitor (C1) via said thyristor (TR).

27. Apparatus as claimed in claim 25, wherein:

said means (RA) for controlling said thyristor (TR) include a transistor (T1) having an emitter, a base and a collector, means (V) for biasing said emitter, a resistor (R6) connected between said base and said logic circuit means, and a resistor (R5) connected between said collector and said control electrode of the thyristor (TR).

28. Apparatus as claimed in claim 22, wherein:
said third signal providing means ($\phi$, TG) and said means (RA) for controlling said thyristor (TH, TR) include means for effecting the firing of said thyristor (TH, TR) independently of the discharge condition of said capacitor (C1).

29. Apparatus as claimed in claim 22, wherein:
said thyristor is a one-way thyristor (TH).

30. Apparatus as claimed in claim 29, including:
a diode (D2) bridging said one-way thyristor (TH) in its backward direction.

31. Apparatus as claimed in claim 30, wherein:
said means (RA) for controlling the thyristor (TH) include a series-connected capacitor (C3) and a further diode (D5) connecting said logic circuit means (G) to said control electrode of the thyristor (TH), a resistor (R8) connected between the junction of said series-connected capacitor (C3) and further diode (D5); and
said apparatus include a resistor (R7) connecting said control electrode to a first further electrode of said thyristor (TH), means for selectively discharging said capacitor (C1) including a transistor (T2) connected via a resistor (R11) between a second further electrode of said thyristor (TH) and a point reference potential, and means connected to said transistor (T2) for rendering said transistor (T2) conductive during intervals between a conductive condition of said thyristor (TH).

32. Apparatus as claimed in claim 31, wherein:
said ringing current supply (RQ) has means (H) for providing an alternating current being opposite in phase to said ringing currents; and
said means for selectively discharging said capacitor (C1) include a resistor (R9) for connecting a control electrode of said transistor (T2) to said means (H) for providing said phase opposite alternating current.

33. Apparatus as claimed in claim 32, including:
a Zenor diode (Z) connected between said second further electrode of said thyristor (TH) and said control electrode of said transistor (TZ); and
a resistor (R10) connected between said control electrode of said transistor (T2) and a point of reference potential.

34. Apparatus as claimed in claim 33, wherein:
said third control signal providing means ($\phi$, TG) include means for shifting the phase of said third control signal (RT) by an angle ($\phi$) relative to the ringing currents (RS) assuring the firing of said thyristor (TH) independently of the discharge condition of said capacitor (C1).

35. Apparatus as claimed in claim 22, wherein:
said ringing current supply (RQ) includes means providing said ringing currents in the form of half-wave currents;
said thyristor is a two-way thyristor (TR); and
said third control signal providing means ($\phi$, TG) include means for shifting the phase of said third control signal (RT) by an angle ($\phi$) relative to said half-wave currents assuring the firing of said two-way thyristor (TR) in intervals between, as well as during, said half-wave currents.

* * * * *

UNITED STATES PATENT OFFICE
CERTIFICATE OF CORRECTION

Patent No. 4,001,516     Dated January 4, 1977

Inventor(s) Günther Weisigk et al

It is certified that error appears in the above-identified patent and that said Letters Patent are hereby corrected as shown below:

Column 5, line 13, "100" should be --$\phi$--;
Column 9, line 29, (Claim 1), "the" should be --and--;
Column 12, line 15, (Claim 20), after "(TH)" insert --having--;
Column 13, line 35, (Claim 31), after "point" insert --of--.

Signed and Sealed this

Fourteenth Day of June 1977

[SEAL]

Attest:

RUTH C. MASON
*Attesting Officer*

C. MARSHALL DANN
*Commissioner of Patents and Trademarks*